3,233,009
MALEATED POLYMERS FROM STYRENE AND HYDROXYL-CONTAINING NORBORNENE DERIVATIVES

Daniel J. Carlick, Berkeley Heights, N.J., and Michael Becher, Brooklyn, N.Y., assignors to Interchemical Corporation, New York, N.Y., a corporation of Ohio
No Drawing. Filed Sept. 28, 1961, Ser. No. 141,536
5 Claims. (Cl. 260—875)

This is a continuation-in-part of copending application Serial No. 55,148, filed September 12, 1960.

This invention relates to addition products of maleic anhydride and copolymers of styrene with hydroxyl-containing norbornene derivatives and to products made therefrom. U.S. Patent No. 2,985,611 describes certain copolymers of non-allylic alcohols containing the norbornene nucleus with alkyl esters of acrylic and methacrylic acid. These copolymers have valuable properties, as disclosed in said application, which make them useful in the formulation of coatings. The copolymers of U.S. Patent No. 2,985,611 are polyols since at least part of the hydroxy groups of the non-allylic alcohol are retained. The non-allylic alcohols containing the norbornene nucleus, as shown in copending application Serial No. 55,148, can be homopolymerized to give useful resinous polyols. 2-hydroxy-methyl-5-norbornene, for instance, gives a hard brittle resin when subjected to temperatures of 110 to 160° C. and free radical catalysts that decompose only at these high temperatures.

Norbornene has the formula $$\begin{array}{c}\text{CH}\\\text{HC}\diagup\!\!\!\diagdown\text{CH}_2\\|\quad\text{CH}_2\quad|\\\text{HC}\diagdown\!\!\!\diagup\text{CH}_2\\\text{CH}\end{array}$$

and may be conveniently represented by the symbolic formula

Non-allylic alcohols containing the norbornene nucleus suitable for use in the practice of this invention include 2-hydroxymethyl-5-norbornene,

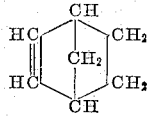

x-methyl-2-hydroxymethyl-5-norbornene,

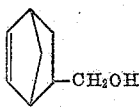

2,2-bis-(hydroxymethyl)-5-norbornene,

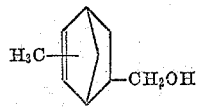

2-methyl-2-hydroxymethyl-5-norbornene,

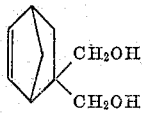

x-methyl-2,2-bis-(hydroxymethyl)-5-norbornene,

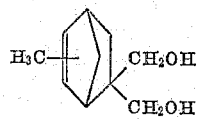

2,3-bis-(hydroxymethyl)-5-norbornene,

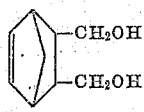

and x-methyl-2,3-bis-(hydroxymethyl)-5-norbornene

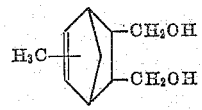

These non-allylic alcohols containing the norbornene nucleus may all be made by means of known and relatively simple Diels-Alder condensations. The preparation of these Diels-Alder condensation products constitutes no part of the instant invention, but will be here outlined very briefly so that those versed in the art of chemical synthesis can readily have the desired materials available for the practice of this invention. 2-hydroxymethyl-5-norbornene may be prepared, following the disclosures of U.S. Patents 2,596,279 and 2,353,606, by heating cyclopentadiene with with allyl alcohol, which causes the following reaction to occur:

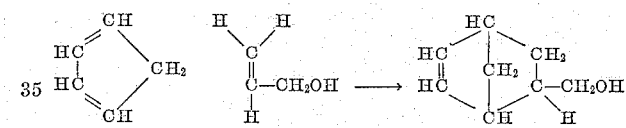

If methylcyclopentadiene is employed instead of cyclopentadiene, then one obtains x-methyl-2-hydroxymethyl-5-norbornene, the x-indicating uncertainty as to the exact position occupied by the methyl group on the 5-atom ring derived from the methylcyclopentadiene starting material.

2 - methyl - 2 - hydroxymethyl - 5 - norbornene may be prepared conveniently by a Diels-Alder condensation of cyclopentadiene with methallyl alcohol. If methylcyclopentadiene is employed, a 2,x-dimethyl-2-hydroxymethyl-5-norbornene is formed.

The 2,3 - bis - (hydroxymethyl) - 5 - norbornene may be prepared similarly by reaction butene-1,4-diol with cyclopentadiene or methylcyclopentadiene.

The 2,2 - bis - (hydroxymethyl) - 5 - norbornene can be prepared by condensing cyclopentadiene with acrolein to yield a 5-norbornene-2-carboxyaldehyde. By treatment of this aldehyde with two mols of aqueous formaldehyde in the presence of sodium hydroxide, there results an aldolization and cross-Cannizzaro reaction by which there is formed sodium formate and 2,2-bis-(hydroxymethyl)-5-norbornene.

The 2-hydroxymethyl-5-norbornene is most easily prepared by reaction of cyclopentadiene with vinyl acetate to yield 2-acetoxy-5-norbornene, followed by saponification to yield the cyclic alcohol. Similarly, by use of methylcyclopentadiene, one can obtain an x-methyl-2-hydroxy-5-norbornene product.

Among the above non-allylic alcohols containing the norbornene nucleus, the primary alcohols are preferred with the 2-hydroxymethyl-5-norbornene the most preferred.

The homopolymerization of a non-allylic alcohol containing the norbornene nucleus is preferably conducted in mass and is initiated by "catalysts" or polymerization initiators of the free radical type that decompose at temperatures of 110° C. to 160° C. Di-tertiary-butyl peroxide and tertiary-butyl perbenzoate are the preferred catalysts.

Advantageously the properties of the homopolymerization products described above are further modified and improved by graft polymerization with one or more different addition polymerization monomers, as disclosed in co-pending application Serial No. 55,148. The desired addition polymerization monomer (or monomers) is gradually added to the batch containing the preformed homopolymer and the reaction is continued to form the graft polymer. The properties of the graft polymers can be varied depending upon the type and quantity of monomer, or monomers that are grafted onto the particular homopolymer.

Preferably the homopolymerization is carried out by bubbling oxygen or oxygen-containing gas, such as air, through a solution of the catalyst in the monomer at the appropriate temperature. This technique will generally give a higher yield of resin than is obtained without bubbling oxygen or air through the monomer. In addition, temperatures as low as 110° C. can be used to produce homopolymers by the technique just described.

A new resin of the unsaturated polyester type has now been synthesized which, when blended with a polymerizable monomer such as styrene and a free radical catalyst such as benzoyl peroxide, can be heat cured to a translucent, rigid material having exceptionally good tensile strength, fast cure, and excellent resistance to acids and alkalies. This material has valuable properties for casting, lamination, and as a binder for fibrous fillers. The unsaturated polyesters now used for these purposes suffer from dimensional instability, which is caused by hydrolysis of their ester linkages. The polyesters of the instant invention exhibit extremely good resistance to hydrolysis and therefore have excellent dimensional stability. This is due to the vinyl type carbon backbone and the presence of ester linkages only in the side chains. The tensile strength is much greater than that of standard unsaturated polyesters. Another valuable improvement over conventional polyesters is the property of immunity from air inhibition, so that the unsaturated polyesters of this invention, when used for example in wood finishes, dry tack free.

The polymers of this invention are preferably made by graft copolymerization of styrene onto 2-hydroxymethyl-5-norbornene in an equimolar ratio followed by treatment with enough maleic anhydride that would be needed to form a half ester. The ring opens and an addition product is formed, no water of reaction being produced (anhydride+hydroxyl). The ring opening takes place rapidly, the theoretical acid value of 75 being attained in 15 minutes. Since the styrene copolymer with the norbornene derivative is a polyol, anything approaching full esterification of the acid groups would give crosslinking and an insoluble product. Other copolymers of styrene with hydroxyl-containing norbornene derivatives may be similarly maleated to give similar products provided the norbornene alcohol constitutes at least about 20% by weight of the copolymer.

*Example 1*

6 moles of 2-hydroxymethyl-5-norbornene, in which 7.4 g. of tertiary-butyl perbenzoate were dissolved, were pretreated by bubbling oxygen through at a rate of 3 to 4 cc. per second for 2 hours at a temperature of 110° C. The oxygen was cut off and the material then heated under a blanket of nitrogen at 135° to 145° C. while 6 moles of styrene monomer containing 1.2% of di-tertiary-butyl peroxide were added dropwise over a period of 3.5 hours. Heating was continued at 150° C. for 1 hour more then the excess monomers were stripped off under vacuum. The hydroxyl content indicated 20% of 2-hydroxymethyl-5-norbornene.

*Example 2*

1310 g. (2 equivalents) of the copolymer prepared by the method of Example 1 were heated 20 minutes with 196 g. (4 equivalents) of maleic anhydride at a temperature of 150–160° C. under a blanket of nitrogen. The resin thus obtained was a yellow transparent brittle solid having a melting point of 135 to 145° C.

*Example 3*

50 to 70 g. of the polymer obtained by the method of Example 2 were dissolved in 50 to 30 g. of monomeric styrene. 0.5 g. of benzoyl peroxide was dissolved in the viscous solution, which was then poured into a suitable casting device and cured at 80° C. for about 2 hours. A yellowish translucent rigid casting was obtained.

Reaction initiators suitable for the process of Example 1 are tertiary-butyl perbenzoate, di-tertiary-butyl peroxide, methyl ethyl ketone peroxide, tertiary-butyl peracetate, dicumyl peroxide and di-tertiary-butyl diperphthalate.

A comparison was made between the materials described in Example 3 and a general purpose, typical commercial unsaturated polyester made from propylene glycol, maleic anhydride, phthalic anhydride, and styrene, hereafter referred to as polyester A. The composition of Example 3 having a 50–50 sytrene monomer resin ratio but with 1% benzoyl peroxide was used in the tests. The solids content of polyester A was also brought to 50% by addition of styrene. Clear castings ⅛ inch thick of both polyesters were then made using a curing schedule of 20 minutes at 80° C. followed by 40 minutes at 110° C. The results are tabulated.

| Resin | Barcol Hardness | Tensile Strength, p.s.i. | Flexural Strength, p.s.i. | Modulus of Flexure |
|---|---|---|---|---|
| Polyester A | 46 | 1,760 | 13,950 | 4.97×10⁵ |
| Example 3 | 35 | 4,540 | 8,180 | 4.51×10⁵ |

Pieces of each of these cured polyester were immersed in 5% aqueous caustic alkali solution for two weeks. Th polyester of Example 3 was clear and unaffected at the end of this period. Polyester A showed haze in two days and lost its transparency completely in the two weeks.

Similarly, 60%-solid solutions in styrene of polyester A and the polyester of Example 3, each catalyzed by ½% benzoyl peroxide, were cured 2½ hours at 80° C. in the molds specified by the ASTM D648–56 test for heat distortion. The deflection temperature (degrees centigrade per 10 mils) for polyester A was 69° C. and for the polyester of example 3, 68° C.

The heat-cured polyesters of this invention form rigid translucent materials of exceptionally good tensile properties, excellent for use in casting and laminating and forming an excellent binder for fibrous fillers. The polyesters are quick curing and have excellent resistance to acids and alkalies.

What is claimed is:

1. The addition reaction product formed by reacting 2 equivalents of maleic anhydride with 1 equivalent of the graft copolymer formed by grafting 1 equivalent of styrene onto 1 equivalent of a preformed homopolymer of 2-hydroxymethyl-5-norbornene.

2. The product of claim 1 in which the graft copolymer contains at least about 20% of the 2-hydroxymethyl-5-norbornene nucleus.

3. The polymerization product of 30 to 50% by weight of styrene with 50–70% by weight of the product of claim 1.

4. The polymerization product of 30 to 50% by weight of styrene with 50–70% by weight of the product of claim 2.

5. The process of making a half ester of maleic anhydride consisting essentially of (1) homopolymerizing 1 equivalent of 2-hydroxymethyl-5-norbornene,
(2) graft copolymerizing 1 equivalent of styrene thereon, and
(3) reacting 1 equivalent of said graft copolymer with 2 equivalents of maleic anhydride.

References Cited by the Examiner

UNITED STATES PATENTS

| | | | |
|---|---|---|---|
| 2,557,136 | 6/1951 | Nichols | 260—617 |
| 2,677,671 | 5/1954 | Yuska et al. | 260—23.7 |
| 2,985,611 | 5/1961 | Gaylord et al. | 260—30.8 |
| 3,035,008 | 5/1962 | Gaylord | 260—855 |
| 3,066,114 | 11/1962 | Hagele et al. | 260—871 |

FOREIGN PATENTS

| | | |
|---|---|---|
| 21,154 | 4/1961 | East Germany. |
| 766,666 | 1/1957 | Great Britain. |

MURRAY TILLMAN, *Primary Examiner.*

LEON J. BERCOVITZ, *Examiner.*